(12) United States Patent
Goel et al.

(10) Patent No.: US 6,706,185 B2
(45) Date of Patent: Mar. 16, 2004

(54) BIOLOGICAL METHOD OF PHOSPHORUS REMOVAL AND BIOLOGICAL PHOSPHORUS-REMOVING APPARATUS

(75) Inventors: Rajeev Goel, Kanagawa-ken (JP); Hidenari Yasui, Kanagawa-ken (JP)

(73) Assignee: Kurita Water Industries Ltd., Tokyo (JP)

(*) Notice: Subject to any disclaimer, the term of this patent is extended or adjusted under 35 U.S.C. 154(b) by 9 days.

(21) Appl. No.: 10/151,962

(22) Filed: May 22, 2002

(65) Prior Publication Data

US 2003/0217968 A1 Nov. 27, 2003

(51) Int. Cl.[7] .................... C02F 3/30
(52) U.S. Cl. ............... 210/605; 210/623; 210/626; 210/195.3; 210/259; 210/906
(58) Field of Search ................... 210/605, 623, 210/624, 626, 630, 195.1, 195.2, 195.3, 252, 259, 906

(56) References Cited

U.S. PATENT DOCUMENTS

| | | | |
|---|---|---|---|
| 3,764,523 A | | 10/1973 | Stankewich, Jr. |
| 3,939,068 A | | 2/1976 | Wendt et al. |
| 3,953,327 A | | 4/1976 | Parker |
| 3,964,998 A | | 6/1976 | Barnard |
| 3,994,802 A | | 11/1976 | Casey et al. |
| RE32,429 E | | 6/1987 | Spector |
| 5,853,589 A | * | 12/1998 | Desjardins et al. ......... 210/605 |
| 6,555,002 B2 | * | 4/2003 | Garcia et al. ............... 210/605 |

FOREIGN PATENT DOCUMENTS

| | | |
|---|---|---|
| JP | 6-206088 | 7/1994 |
| JP | 07-96297 | 4/1995 |
| JP | 10-490 | 1/1998 |
| JP | 10-015585 | 1/1998 |
| JP | 11-10191 | 1/1999 |
| JP | 11-57773 | 3/1999 |
| JP | 11-188383 | 7/1999 |
| JP | 2002-186992 | 7/2002 |
| JP | 2002-192185 | 7/2002 |
| JP | 2002-248498 | 9/2002 |
| JP | 2002-273491 | 9/2002 |

* cited by examiner

*Primary Examiner*—Fred G. Prince
(74) *Attorney, Agent, or Firm*—Burns, Doane, Swecker & Mathis, L.L.P.

(57) ABSTRACT

An apparatus and method for the biological removal of phosphorus, in which raw water is introduced into the anaerobic tank 11, together with returned sludge from the sludge return pipe 14. Some of the water in the anaerobic tank 11 is sent to the solid/liquid separating device 16 and the rest is sent to the aerobic tank 12. Some of the water which contains the released phosphorus in the anaerobic tank 11 is sent via the pipe 15 to the second solid/liquid separating device 16, and subjected to a solid/liquid separation treatment. The separated water fraction is sent to the phosphorus-removing apparatus 17 and the phosphorus is removed. Some of the solid fraction is introduced into the anaerobic tank 11. The remainder is sent from the pipe 19 to the solubilizing tank 20 and subjected to a solubilizing treatment, and then it is returned to the anaerobic tank 11.

37 Claims, 7 Drawing Sheets

BIOLOGICAL METHOD OF PHOSPHORUS REMOVAL AND BIOLOGICAL PHOSPHORUS-REMOVING APPARATUS

CROSS-REFERENCE TO RELATED APPLICATIONS

The present application corresponds to JP 2000-385659, filed Dec. 19, 2000, and to JP 2000-398231, filed Dec. 27, 2000, the subject matter of which is hereby incorporated herein by reference.

BACKGROUND OF THE INVENTION

1. Technical Field

The invention concerns a method and apparatus for the biological removal of phosphorus from raw water, and in particular a method and apparatus for the biological removal of phosphorus which has a sludge-reducing solubilizing means, in which phosphorous removal is carried out biologically by means of an anaerobic/aerobic method.

2. Related Art

In an active sludge treatment process where waste water which contains phosphorus is subjected to a biological treatment with active sludge, the amount of phosphorus is reduced along with the degradation of the organic compounds in the raw water. In the metabolism of materials by microorganisms, phosphorus is also included in ATP and nucleic acids (DNA, RNA), and it is an essential element for biomass synthesis. Generally, about 2.3% phosphorus is present in activated sludge, and the removal of the phosphorus with the progress of biomass synthesis can be expected. However, the amount of phosphorus removed in activated sludge treatment, if the average retention time of the sludge is held constant, is roughly proportional to the organic material concentration in the waste water, and so the amount of phosphorus which can be removed is limited.

On the other hand, under certain specified conditions, a large amount of phosphorus other than the phosphorus required for growth and metabolism of the biomass is accumulated in the biomass, and the phosphorus concentration in such activated sludge can reach from 6 to 8%. The phenomenon is called excess uptake or luxury uptake. That is to say, sludge where the environment of the activated sludge has been rendered anaerobic and which has forcibly released phosphorus subsequently exhibits a marked increase in the amount of phosphorus which is taken up.

In an apparatus for the biological removal of phosphorus, use is made of the luxury uptake phenomenon such that return sludge is introduced into an anaerobic tank into which the raw water is introduced and phosphorus is released from the sludge, and the raw water which contains the phosphorus-deficient sludge is subjected to an aerobic treatment and the phosphorus is taken up in excess by the sludge and phosphorus is removed.

In an apparatus for the biological removal of phosphorus of this type, the phosphorus is taken up in the sludge and separated from the water along with the excess sludge, but there is a disadvantage in that a large amount of sludge is formed.

Thus, an apparatus for the biological removal of phosphorus, in which some of the return sludge is left to stand in an anaerobic tank and phosphorus is released and then this is subjected to solid/liquid separation, the solid fraction is solubilized and the amount of sludge is reduced in volume, has been proposed (Japanese Unexamined Laid Open Patent Application H11-188383). Furthermore, an apparatus for the biological removal of phosphorus, in which the return sludge is solubilized and the sludge is reduced in volume and at the same time the phosphorus-containing water which is discharged from the sludge in the anaerobic tank is subjected to a crystallization type phosphorus removal treatment, has been proposed by the present applicant (Japanese Unexamined Laid Open Patent Application H11-57773).

A schematic representation of the phosphorus-removing apparatus of Japanese Unexamined Laid Open Patent Application H11-188383 is shown in FIG. 5, where the raw water 31 is introduced into the anaerobic tank 33 of the biological phosphorous-removal activated sludge treatment process 32 along with return sludge 38 from the settling tank 35 and ozone-oxidized sludge 49 which is discharged from the ozone oxidation tank 48, and BOD elimination and absorption of phosphorus by the phosphorus-removing bacteria are carried out in the anaerobic tank 33 and the aerobic tank 34 which is connected thereto in the process 32. Some of the sludge in the same process is sent to the settling tank 35 and the supernatant water in the settling tank 35 is taken out as treated water 36, and most of the settled sludge 37 which has settled out is recycled to the anaerobic tank 33 as the returned sludge 38.

A part of the sludge is divided off from the aforementioned settled sludge 37 and is poured into the sludge anaerobic tank 40 as the branched or divided sludge 39 and phosphorus is released from the phosphorus-containing sludge on being left to stand here under anaerobic conditions. The sludge in the sludge anaerobic tank 40 is then subjected to solid/liquid separation by means of a membrane separating tank 41, and then the separated sludge 43 obtained by solid/liquid separation is introduced into an ozone-oxidation tank 48 and subjected to oxidative degradation with ozone, and soluble organic material is dissolved out. The ozone-oxidized sludge 49 produced in this ozone-oxidation tank 48 is returned to the anaerobic tank 33 of the biological phosphorous removal activated sludge treatment process 32 and then flows into the aerobic tank 34, and the ozone-oxidized sludge 49 (of which the biodegradability by microorganisms has been improved) is degraded to carbon dioxide gas and water microbiologically.

The activated sludge which has been propagated by elimination of the BOD of the raw water in this way is degraded to carbon dioxide gas and water by circulation through the sludge anaerobic tank 40, the ozone-oxidation tank 48 and the biological phosphorus-removing activated sludge treatment process 32, and so it should be discharged out of the system and the amount of excess sludge is more or less zero.

Moreover, soluble organic matter (BOD) is included in abundance in the ozone-oxidized sludge 49 as a result of the oxidative degradation of the activated sludge with ozone and so, if this is added to the anaerobic tank 33, the phosphorus release from the phosphorus-removing bacteria can be made to occur actively. Furthermore, if the sludge is left to stand anaerobically beforehand in the sludge anaerobic tank 40, the solubilization rate of the sludge is improved in the ozone-oxidation of sludge in the ozone-oxidizing tank 48.

On the other hand, metal compounds which bring about chemical precipitate-forming reactions with phosphorus, such as calcium, magnesium, aluminum or iron compounds for example, are added in the phosphorus chemical-removal process 45 to the solid/liquid separated water 42 from the membrane separating tank 41 and the phosphorus is precipitated and separated and recovered as a calcium phosphate compound, such as hydroxyapatite, magnesium ammonium phosphate (MAP), aluminum phosphate or iron phosphate. In the case of FIG. 5, calcium hydroxide 44 is used for the metal compound and the hydroxyapatite 47 is produced.

The biological phosphorus-removing apparatus of the aforementioned Japanese Unexamined Laid Open Patent Application No. H11-57773 is an apparatus for the biological removal of phosphorus by means of an anaerobic/aerobic method, in which there is provided a sludge solubilizing process to which some return sludge is introduced, a means of returning sludge which has been solubilized in said sludge solubilizing device to the anaerobic tank, and a phosphorus-removal reaction column into which the liquid from the anaerobic tank is introduced.

In that apparatus for the biological removal of phosphorus, the volume of sludge can be reduced by solubilizing at least some of the return sludge and subjecting it to biological treatment once again. Furthermore, by removing and recovering the phosphorus which is included in the solubilized sludge obtained by solubilizing the returned sludge as MAP (magnesium ammonium phosphate) by way of the anaerobic tank and the phosphorus-removing column (MAP reaction column), it is possible to remove the phosphorus from the system.

A schematic drawing which shows the apparatus for the biological removal of phosphorus disclosed in the aforementioned Japanese Unexamined Laid Open Patent Application H11-57773 is shown in FIG. 6, and this comprises an anaerobic tank 1, a MAP reaction column 2, a denitrification tank 3, a nitrification tank (aerobic tank) 4, a settling tank 5 and a solubilizing tank 6. The waste water is introduced into the anaerobic tank 1 together with solubilized sludge from the solubilizing tank 6. In the anaerobic tank 1, under anaerobic conditions, the phosphorus in the solubilized sludge is released to the liquid side (this phosphorus is almost all in the form of orthophosphoric acid which is convenient for MAP formation). This anaerobic treatment liquid is introduced into the MAP reaction column 2 and generally has a phosphorus concentration of from 15 to 25 mg/l and so the MAP formation reaction proceeds smoothly.

In the MAP reaction column 2, an alkali such as NaOH is introduced in such a way as to set the preferred pH conditions of from pH 8 to 10, and most desirably of from pH 8 to 9, for MAP, along with, in those cases where there is insufficient magnesium to precipitate MAP, the addition of a magnesium compound such as $MgCl_2$ or $Mg(OH)_2$, for example, (this should contain a magnesium compound and may be sea water), and the phosphorus and ammonia in the liquid react with the magnesium to form MAP which forms a precipitate, and the phosphorus in the liquid is removed in this way. In particular, the phosphorus in the solubilized sludge is in the form of orthophosphoric acid which is convenient for the formation of MAP as a result of the biological treatment, and the MAP formation reaction efficiency in the MAP reaction column 2 is high and so the removal of phosphorus is carried out efficiently.

The liquid which flows out of the MAP reaction column 2 is generally a liquid which has a phosphorus concentration of some 10 mg/l and this discharged liquid is then introduced into the denitrification tank 3. In the denitrification tank 3, the BOD in the waste-water is utilized and the $NO_3$ and $NO_2$ in the nitrification cycle liquid provide for nitrogen removal.

The liquid from the nitrogen removal treatment is introduced into the nitrification (aerobic) tank 4 and, by aeration, the ammonia in the liquid is oxidized to $NO_3$ and $NO_2$. Furthermore, under aerobic conditions the phosphorus is taken up by the activated sludge and the phosphorus concentration in the liquid is reduced.

Some of the nitrification treatment liquid is returned to the denitrification tank 3 to provide $NO_3$ and $NO_2$ and the rest is supplied to the settling tank 5 and subjected to solid/liquid separation.

The separated liquid from the settling tank 5 is discharged from the system as treated water. This treated water is water of good quality from which the phosphorus and nitrogen have been removed by the formation of MAP in the MAP reaction column 2 and, moreover, nitrogen has been removed in the denitrification tank 3 and phosphorus has been removed in the aerobic tank 4.

On the other hand, at least some of the separated sludge in the settling tank 5, which has taken up phosphorus in the form of orthophosphate as a result of the biological treatment, is introduced into the solubilizing tank 6 and subjected to a solubilizing treatment by blowing in ozone gas. That is to say, the sludge is oxidatively degraded to BOD components and solubilized with ozone.

As well as pure ozone, ozone-containing air or ozonized air, for example, can be used for the ozone treatment gas in the solubilizing tank 6.

As a result of various studies, it has been recognized that the rate of release of phosphorus is slow with the apparatus for the biological removal of phosphorus shown in FIG. 5 because there is virtually no substrate in the sludge anaerobic tank. Furthermore, because the sludge in the phosphorus-releasing tank is concentrated and the whole amount is solubilized, phosphorus removal and the reduction in sludge volume are even and the extent of the two actions are not interrelated and are difficult to set. Furthermore, in the apparatus for the biological removal of phosphorus shown in FIG. 6, it has been confirmed that the water which is introduced into the MAP reaction column contains a large amount of sludge so that the MAP production reaction is impeded.

OBJECTS AND SUMMARY

The present invention is intended to provide an apparatus for the biological removal of phosphorus with which the volume of sludge is reduced and the phosphorus removal efficiency is increased.

According to one embodiment of the present invention, a biological method of removing phosphorus from raw water, comprises releasing phosphorus from activated sludge in an anaerobic tank in a phosphorus-releasing step, absorbing the phosphorus with activated sludge in a mixed liquor of the raw water and the activated sludge in an aerobic tank in a phosphorus-absorbing step, separating sludge from the mixed liquor in a first solid/liquid separation step, supplying the sludge which has been concentrated and separated from the mixed liquor in the first solid/liquid separation step to the anaerobic tank, subjecting the sludge from the phosphorus-releasing step to a second solid/liquid separation step, solubilizing sludge which has been concentrated and separated in the second solid/liquid separation step in a solubilizing step, supplying solubilized sludge of the solubilizing step to the anaerobic tank, and removing phosphorus from liquid which has been separated in the second solid/liquid separation step.

According to the aforementioned embodiment some of the solubilized sludge from the solubilization process is supplied to the phosphorus-releasing process, thereby increasing the substrate concentration in said phosphorus-releasing process. Consequently, the phosphorus release rate in the phosphorus-releasing process is increased and the phosphorus removal can be carried out with better efficiency.

In a further aspect of the aforementioned embodiment, there is a by-pass process in which some of the separated sludge which has been concentrated and separated in the aforementioned second solid/liquid separation process is supplied to the aforementioned phosphorus-releasing process, bypassing the aforementioned solubilization process.

According to this further aspect all of the separated sludge which is concentrated and separated in the second solid/liquid separation process is not supplied to the solubilization process and some of the aforementioned separated sludge is supplied to the aforementioned phosphorus-releasing process, bypassing the aforementioned solubilization process, and so the amount of phosphorus removed and the extent of the reduction in the volume of sludge can be each be set independently and the operation of the apparatus for the execution of the invention is simplified.

In a further aspect of the aforementioned embodiment, the aforementioned solubilized liquid supply process includes a fermentation treatment process in which the solubilized liquid of the aforementioned solubilization process is subjected to a fermentation treatment, and the fermented liquid of said fermentation treatment process is supplied to the aforementioned phosphorus-releasing process.

According to this aspect, it is desirable that the anaerobicity in the anaerobic tank be enforced and that the release of phosphorus be accelerated. For this reason, the sludge which has been solubilized in the solubilization process is preferably introduced into the phosphorus-releasing process via a fermentation treatment process.

An apparatus for the biological removal of phosphorus from raw water according to one embodiment of the present invention comprises an anaerobic tank into which the raw water and activated sludge are introduced to form a mixed liquor, an aerobic tank in which the mixed liquor from the anaerobic tank is aerated, a settling tank in which the mixed liquor flowing out of said aerobic tank is subjected to solid/liquid separation, a first pipe connecting the settling tank to the anaerobic tank whereby some of the sludge separated from the mixed liquor in the settling tank is returned as the activated sludge to the anaerobic tank, a phosphorus-releasing tank in which a remaining portion of the separated sludge from the settling tank is maintained anaerobically and phosphorus is released from the sludge, a solid/liquid separating device in which sludge admixed liquid from the phosphorus-releasing tank is subjected to solid/liquid separation, a solubilizing device in which sludge separated in said solid/liquid separating device is solubilized, a solubilized sludge returning device with which sludge which has been solubilized in said solubilizing device is returned to the anaerobic tank, a second pipe for supplying some of the sludge which has been solubilized in the solubilizing device to the phosphorus-releasing tank, and a phosphorus-removing device in which phosphorus is removed from water which has been separated in the solid/liquid separating device.

In the aforementioned apparatus for the biological removal of phosphorus, some of the solubilized sludge from the solubilizing tank is supplied to the phosphorus-releasing tank, thereby raising the substrate concentration in said phosphorus-releasing tank. Consequently, the phosphorus-releasing rate in the phosphorus-releasing tank is increased and it is possible to carry out the removal of phosphorus more efficiently.

An apparatus for the biological removal of phosphorus according to another embodiment of the present invention includes an anaerobic tank into which raw water and returned sludge are introduced to form a mixed liquor, an anoxic tank in which bound oxygen is applied to the mixed liquor from said anaerobic tank, an aerobic tank in which the mixed liquor from said oxygen-free tank is aerated, a mixed liquor returning means which returns some of the mixed liquor from said aerobic tank to the aforementioned oxygen-free tank, a first solid/liquid separating means in which the liquid flowing out of said aerobic tank is subjected to solid/liquid separation, a means whereby some of the solid/liquid separated sludge from said first solid/liquid separating means is returned as the aforementioned returned sludge to the aforementioned anaerobic tank, a phosphorus-releasing tank in which the remaining solid/liquid separated sludge from the aforementioned first solid/liquid separating means is maintained anaerobically and the phosphorus is released, a second solid/liquid separating means in which the sludge admixed liquid from said phosphorus-releasing tank is subjected to solid/liquid separation, a solubilizing means in which the sludge separated in said second solid/liquid separating means is solubilized, a solubilized sludge returning means with which sludge which has been solubilized in said solubilizing means is returned to the aforementioned anaerobic tank, a means of supplying some of the sludge which has been solubilized in the aforementioned solubilization means to said phosphorus-releasing tank, and a phosphorus-removing means with which phosphorus is removed from separated water which has been separated in the aforementioned second solid/liquid separating means.

In the immediately aforementioned apparatus for the biological removal of phosphorus, some of the solubilized sludge from the solubilizing tank is supplied to the phosphorus-releasing tank, thereby increasing the substrate concentration of said phosphorus-releasing tank. Consequently, the phosphorus-releasing rate in the phosphorus-releasing tank is increased and the removal of phosphorus can be carried out more efficiently. Furthermore, an anoxic tank is established and so it is possible to carry out the removal of nitrogen at the same time as the removal of phosphorus.

In either of the aforementioned apparatus for the biological removal of phosphorus, the aforementioned solubilized sludge returning means may be furnished with a fermentation tank, into which the sludge which has been solubilized in the aforementioned solubilizing means is introduced and subjected to a fermentation treatment, and there may be provided a means whereby the sludge which has been subjected to a fermentation treatment in said fermentation tank is returned to the aforementioned anaerobic tank.

In this embodiment, it is desirable that the anaerobicity in the anaerobic tank is enforced and phosphorus release is promoted. Consequently, the sludge which has been solubilized in the solubilizing means is preferably introduced into the anaerobic tank after a fermentation treatment.

In the immediately aforementioned apparatus for the biological removal of phosphorus, there is provided a means of supplying some of the sludge which has been subjected to a fermentation treatment in the aforementioned fermentation tank to the aforementioned phosphorus-releasing tank.

It is desirable that some of the sludge which has been subjected to the fermentation treatment should be supplied to the phosphorus-releasing tank in order to enforce the anaerobicity of the anaerobic tank and promote the release of phosphorus.

In any of the aforementioned apparati for the biological removal of phosphorus, there may be provided a means whereby some of the phosphorus-releasing sludge which has been separated in the aforementioned second solid/liquid separating means is supplied as it is to the aforementioned anaerobic tank.

With the immediately aforementioned apparatus for the biological removal of phosphorus, not all of the separated sludge which has been concentrated and separated in the second solid/liquid separating means is supplied to the solubilizing tank and some of the aforementioned separated sludge is supplied to the aforementioned anaerobic tank, bypassing the aforementioned solubilizing tank, and so it is possible to set the amount of phosphorus removed and the reduction in volume of the sludge independently, and the operation of the apparatus is simplified. That is to say, some of the phosphorus-releasing sludge which has been separated in the second solid/liquid separating means is supplied as it is to the anaerobic tank without passing through the solubilizing means, thereby providing an advantage in that, even if there are changes in the phosphorous concentration and BOD concentration of the raw water such as an industrial effluent, adjustments can be made to achieve the required phosphorus removal and to carry out a reduction in the excess sludge volume.

An apparatus for the biological removal of phosphorus according to another embodiment of the present invention includes an anaerobic tank into which raw water and return sludge are introduced, an aerobic tank in which the mixed liquor from said anaerobic tank is aerated, a first solid/liquid separating means in which the liquid flowing out of said aerobic tank is subjected to solid/liquid separation, a means whereby at least some of the solid/liquid separated sludge from said first solid/liquid separating means is returned as the aforementioned return sludge to the aforementioned anaerobic tank, a second solid/liquid separating means in which some of the mixed liquor discharged from the aforementioned anaerobic tank is subjected to solid/liquid separation, a solubilizing means in which at least some of the sludge separated in said second solid/liquid separating means is solubilized, a solubilized sludge returning means with which sludge which has been solubilized in said solubilizing means is returned to the aforementioned anaerobic tank, and a phosphorus-removing means with which phosphorus is removed from the separated water which has been separated in the aforementioned second solid/liquid separating means.

In the aforementioned apparatus for the biological removal of phosphorus, return sludge is introduced into the anaerobic tank into which the raw water is introduced and phosphorus is released from said returned sludge. The anaerobic treatment water which contains this released phosphorus is subjected to a solid/liquid separation treatment, and just the separated water is supplied to the phosphorus-removing means, and so the phosphorus removal efficiency of the phosphorus-removing means is increased. Furthermore, the solid fraction separated in the second solid/liquid separating means is subjected to a solubilizing treatment and the volume of sludge is reduced.

An apparatus for the biological removal of phosphorus according to another embodiment of the present invention includes an anaerobic tank into which raw water and return sludge are introduced, an oxygen-free tank in which bound oxygen is administered to the mixed liquor from said anaerobic tank, an aerobic tank in which the mixed liquor from said oxygen-free tank is aerated, a first solid/liquid separating means in which the liquid flowing out of said aerobic tank is subjected to solid/liquid separation, a means whereby at least some of the solid/liquid separated sludge from said first solid/liquid separating means is returned as the aforementioned return sludge to the aforementioned anaerobic tank, a second solid/liquid separating means in which some of the mixed liquor discharged from the aforementioned anaerobic tank is subjected to solid/liquid separation, a solubilizing means in which at least some of the sludge separated in said second solid/liquid separating means is solubilized, a solubilized sludge returning means with which sludge which has been solubilized in said solubilizing means is returned to the aforementioned anaerobic tank, and a phosphorus-removing means with which phosphorus is removed from the separated water which has been separated in the aforementioned second solid/liquid separating means.

With the aforementioned apparatus for the biological removal of phosphorus, it is possible to remove phosphorus and reduce the sludge volume, and nitrogen removal is also possible.

In either of the two immediately mentioned apparati for the biological removal of phosphorus, there may be provided a means whereby the water, from which the phosphorus has been removed in the aforementioned phosphorus-removing means, is subjected to an aerobic treatment or whereby said water is supplied to the aforementioned oxygen-free tank or the aforementioned aerobic tank.

With the aforementioned apparatus for the biological removal of phosphorus, the organic material which is included in the water from which the phosphorus has been removed in the aforementioned phosphorus-removing means is degraded.

In any of the above-mentioned apparati for the biological removal of phosphorus, the aforementioned solubilized sludge returning means may be means which supplies some of the sludge which has been separated by the aforementioned second solid/liquid separating means to the aforementioned solubilizing means, and there is provided a means which supplies the remainder of the sludge which has been separated by said second solid/liquid separating means to the aforementioned anaerobic tank or the aforementioned aerobic tank.

With the aforementioned apparatus for the biological removal of phosphorus, not all of the separated sludge which is concentrated and separated in the second solid/liquid separating means is supplied to the solubilizing tank, and some of the aforementioned separated sludge is supplied to the aforementioned anaerobic tank or the aforementioned aerobic tank, by-passing the aforementioned solubilizing tank, and so it is possible to set the amount of phosphorus removal and the reduction in sludge volume independently, and operation of the apparatus is facilitated.

In any of the four immediately mentioned apparati for the biological removal of phosphorus, the aforementioned solubilized sludge supply means may be furnished with a fermentation tank, into which at least some of the sludge which has been solubilized in the aforementioned solubilizing means is introduced and subjected to a fermentation treatment, and the sludge which has been subjected to the fermentation treatment in said fermentation tank is returned to the aforementioned anaerobic tank.

In this embodiment, it is desirable to enforce the anaerobicity in the anaerobic tank and promote the release of phosphorus. Consequently, it is desirable to introduce the sludge which has been solubilized in the solubilizing means into the anaerobic tank after it has been subjected to a fermentation treatment.

In the immediately aforementioned apparatus for the biological removal of phosphorus, the aforementioned solubilized sludge returning means may supply only some of the sludge which has been solubilized in the aforementioned solubilizing means to the aforementioned fermentation tank, and there may be provided a means by which the remainder sludge which has been solubilized in said solubilizing means is supplied to the aforementioned second solid/liquid separating means.

With the aforementioned apparatus for the biological removal of phosphorus, the phosphorus dissolved out from the sludge by solubilization can be transferred into the separated liquid in the second solid/liquid separating means, and so the phosphorus removal efficiency is increased.

In any of the aforementioned apparati for the biological removal of phosphorus, there may be provided a means which supplies some of the sludge which has been subjected to a fermentation treatment in the aforementioned fermentation tank to the aforementioned second solid/liquid separating means.

With the aforementioned apparatus for the biological removal of phosphorus, the phosphorus dissolved out from the sludge by solubilization can be transferred via the aforementioned fermentation tank to the separated liquid in the aforementioned second solid/liquid separating means, in the same way as in the previously described apparatus for the biological removal of phosphorus, and so the phosphorus removal efficiency is increased.

In any of the three immediately aforementioned apparatus for the biological removal of phosphorus, there may be provided a means whereby some of the raw water is supplied to the aforementioned fermentation tank.

A substrate such as organic material brings about the release of phosphorus in the anaerobic tank, and organic acids are especially effective as substrates. With the aforementioned apparatus for the biological removal of phosphorus, some of the raw water is supplied to the aforementioned fermentation tank, the fermentation treatment is carried out and organic acids are produced, and these are introduced into the anaerobic tank, and so the phosphorous release rate in the anaerobic tank is increased and it is possible to carry out phosphorus removal more efficiently.

The apparatus of this invention can be used to treat various types of phosphorus-containing water, such as town sewage, industrial effluent and river water for example.

DETAILED DESCRIPTION OF THE PREFERRED EMBODIMENTS

Embodiments of the present invention are described below with reference to the drawings. Moreover, the anaerobic tank 11 and phosphorus releasing tank mentioned hereinafter correspond with the "phosphorus-releasing process" in this invention, and the aerobic tank 12, anoxic tank 12-1 and the nitrification tank 12-2 mentioned hereinafter correspond with the "phosphorus-absorbing process" in this invention.

Figure 1:
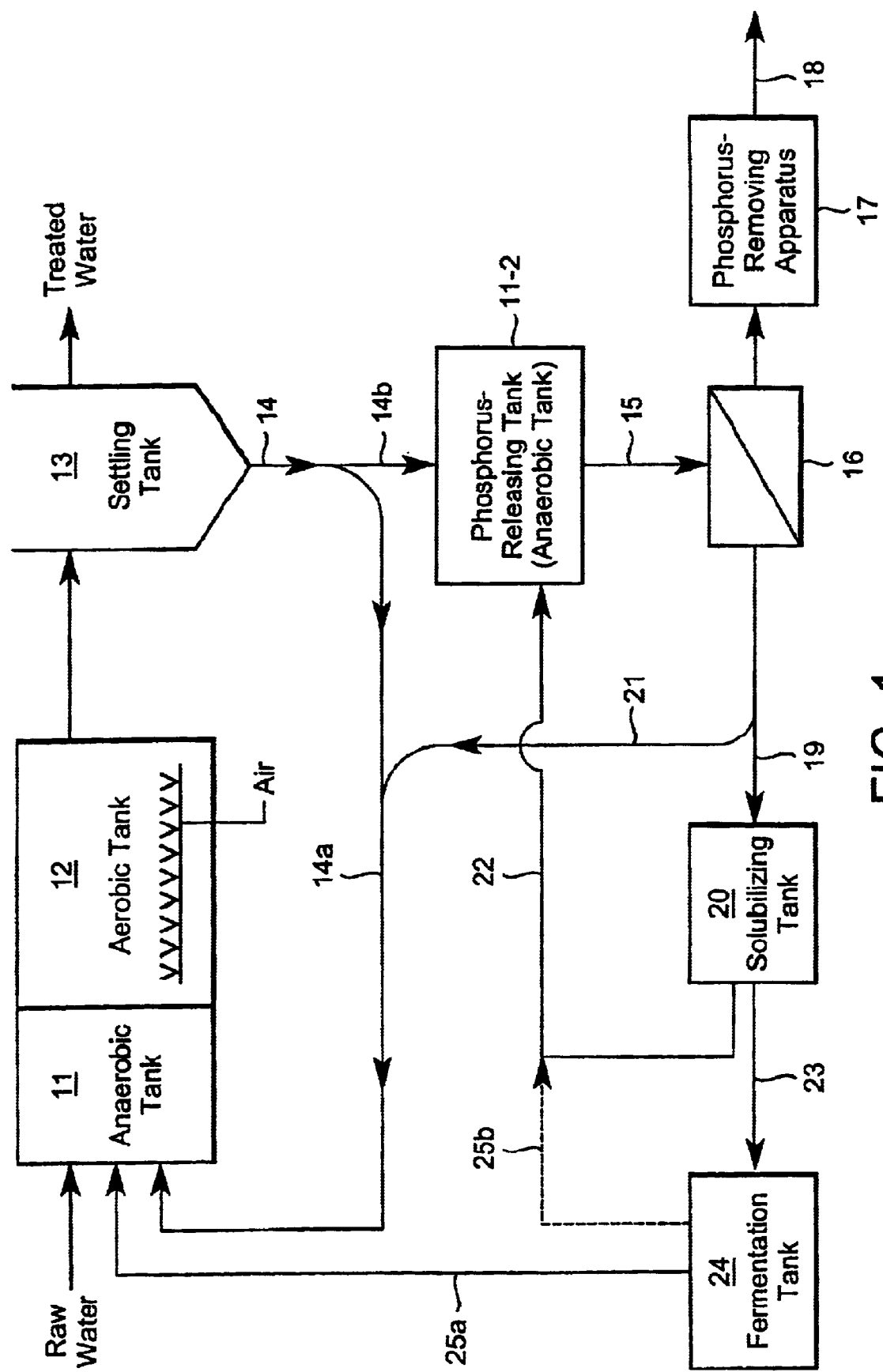
FIG. 1 is a schematic drawing of one embodiment of the invention.

A schematic drawing of an apparatus and a method for the biological removal of phosphorus which is one embodiment of the invention is shown in FIG. 1.

Taw water is introduced into an anaerobic tank 11 together with return sludge from the sludge return pipe 14a. Phosphorus is released from the return sludge in the anaerobic tank 11. Furthermore, the organic materials in the raw water are taken into the biomass of the sludge anaerobically.

The mixed liquor in the anaerobic tank 11 is sent to an aerobic tank 12 and is treated aerobically with air which is blown in from a dispersing pipe, and an aerobic degradation treatment of the organic material is carried out aerobically at the same time as phosphorus is being taken up into the biomass of the sludge.

A tank (not shown in the drawing) which applies bound oxygen (nitrate ion or nitrite ion) may be established instead of the aerobic tank 12. In that case, a nitrified liquid is added from the outside as bound oxygen. An oxygen-free tank which provides bound oxygen is no different aerobically in that bound oxygen is provided instead of providing oxygen gas.

Figure 2:
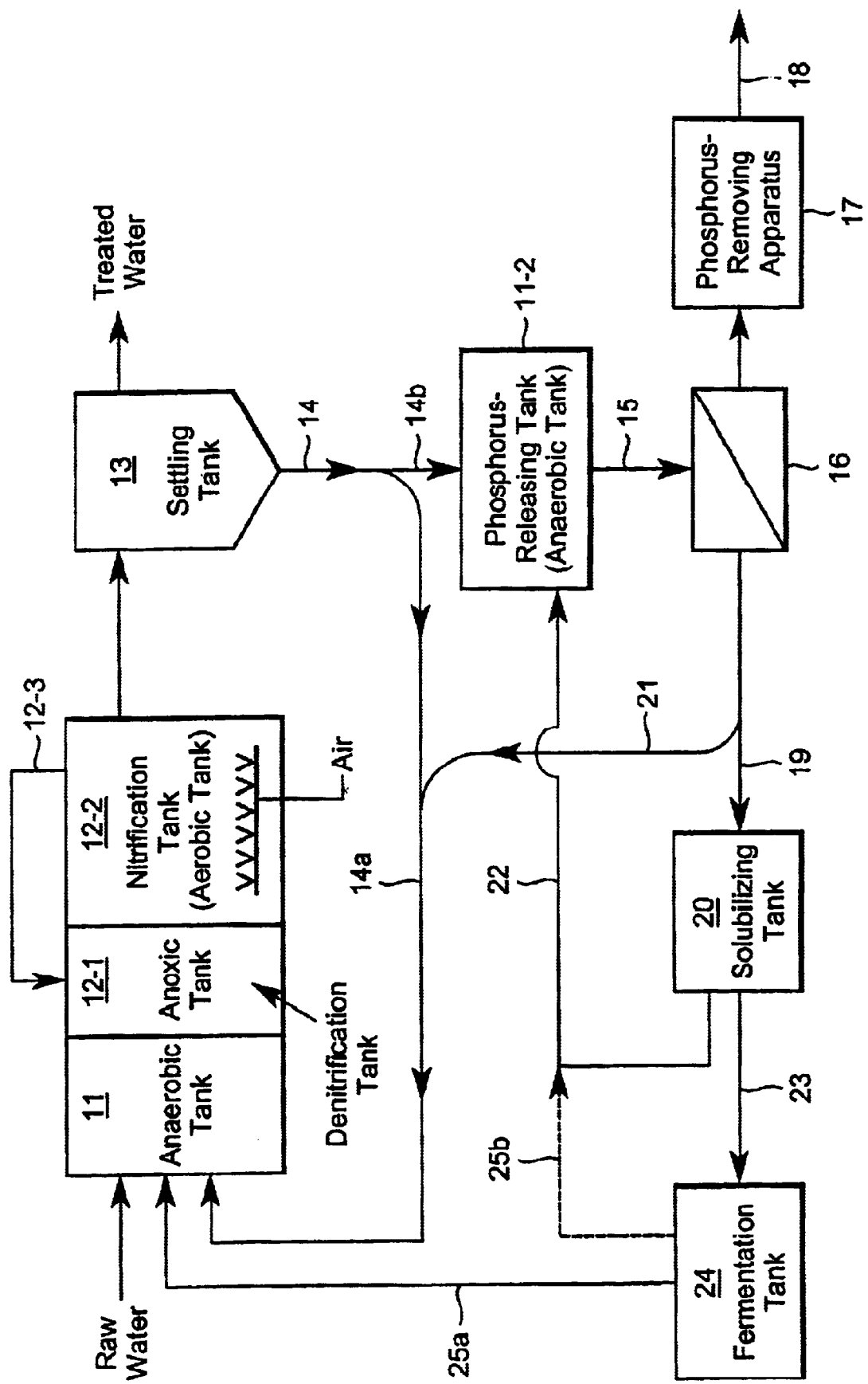
FIG. 2 is a schematic drawing of another embodiment of the invention.

In another embodiment, shown in FIG. 2, a tank (tank 12-1) may be established between the anaerobic tank 11 and the aerobic tank 12-2, and the mixed liquor of the aerobic tank 12-2 can be circulated to the denitrification tank via a pipe 12-3.

The mixed liquor flowing out of the aerobic tank 12 is introduced into the settling tank 13 (the first solid/liquid separating means) and subjected to a solid/liquid separation treatment, and the supernatant water is taken out as treated water. Some of the settled sludge is returned to the anaerobic tank 11, as mentioned earlier, via the sludge return pipes 14 and 14a.

The remainder of the settled sludge is sent to the phosphorus-releasing tank 11-2 via a pipe 14b which branches off from the pipe 14. The phosphorus-releasing tank 11-2 is maintained in an anaerobic state and solubilized sludge is also supplied from the solubilizing tank 20 described hereinafter. Hence, the sludge which is introduced into said phosphorus-releasing tank 11-2 from the pipe 14b is maintained in an anaerobic state and the phosphorus is released more efficiently by the addition of the substrate which is included in the solubilized sludge.

The liquid which contains sludge which has released phosphorus in this way is sent from the phosphorus-releasing tank 11-2 to a second solid/liquid separating means 16 from the pipe 15 and subjected to a solid/liquid separation treatment.

The separated water fraction is sent to a phosphorus-removing apparatus 17 and the phosphorus is removed. The water which is introduced into the phosphorus-removing apparatus 17 has a high phosphorus concentration in solution and, since the sludge has been separated, the phosphorus-removing efficiency of said phosphorus-removing apparatus 17 is very high. The water in pipe 18, from which the phosphorus has been removed in the phosphorus-removing apparatus 17, is introduced into the aerobic tank 12 after passing through the anearobic tank 11. Alternatively, the water, from which the phosphorus has been removed in the phosphorus-removing apparatus 17, is sent to an anoxic tank from the pipe 18, or it is introduced into an aerobic tank separate from the aerobic tank 12, and subjected to an aerobic treatment, and then discharged as treated water.

Some of the solid fraction from the solid/liquid separating means 16 is returned as it is via a pipe 21 and the pipe 14a to the anaerobic tank 11. The remainder is sent from the pipe 19 to the solubilizing tank 20 and, after being subjected to a solubilizing treatment, it is introduced via the pipe 23 to a fermentation tank 24 and, after being subjected to a fermentation treatment, it is returned to the anaerobic tank 11. The amount of excess sludge becomes very small as a result of subjecting the sludge to a solubilizing treatment in this way.

Furthermore, the solubilized sludge is taken up as a carbon source when the microorganisms are releasing phosphorus in the anaerobic tank 11.

Settling separation apparatus, centrifugal separation apparatus, membrane separation apparatus and the like can be used for the abovementioned second solid/liquid separating means 16.

As well, a crystallizing apparatus such as an MAP reaction column, or a coagulation separating apparatus, for example, can be used for the phosphorus-removing apparatus 17.

Furthermore, an ozone-blowing tank can be used for the solubilizing tank 20, but the construction may be such that the sludge is thermally or mechanically solubilized.

In the embodiment described above, some of the sludge from the second solid/liquid separating means 16 is introduced into the anaerobic tank 11, and there is an advantage in that the amount of phosphorus removed and the extent of sludge reduction can be controlled by this means.

In this embodiment, the sludge which has been solubilized in the solubilizing tank 20 is introduced via the pipe 23 to the fermentation tank 24 and, after being subjected to a fermentation treatment, it is supplied via the pipe 25a to the anaerobic tank 11. By returning the solubilized sludge to the anaerobic tank 11 after it has been subjected to a fermentation treatment in this way, the anaerobicity of said anaerobic tank 11 can be enforced (the dissolved oxygen concentration is markedly reduced or there is no dissolved oxygen at all), and it is possible to release phosphorus from the sludge in large amounts in the anaerobic tank 11.

Moreover, some of the sludge which has been fermented in the fermentation tank 24 is supplied via a pipe 25b to the phosphorus-releasing tank 11-2, and the anaerobicity of said phosphorus-releasing tank 112 is enforced and the rate of release of phosphorus in said phosphorus-releasing tank 11-2 may be increased in this way.

Figure 3:
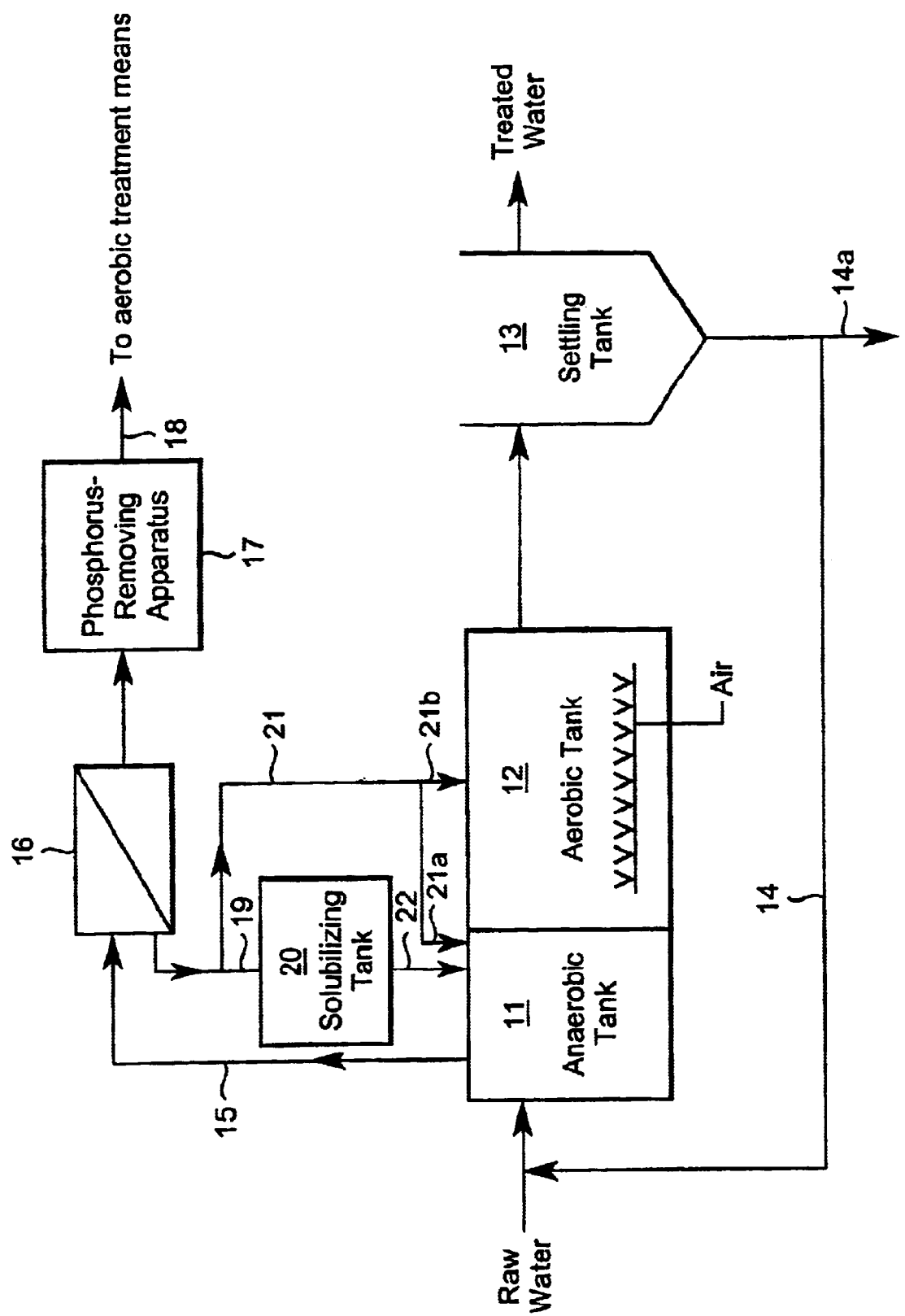
FIG. 3 is a schematic drawing of another embodiment of the invention.

Another embodiment of the invention is described with reference to FIG. 3. FIG. 3 is a schematic drawing of a method and apparatus for the biological removal of phosphorus which is another embodiment of the invention. Raw water is introduced into an anaerobic tank 11 together with return sludge from a sludge return pipe 14. Phosphorus is released from the return sludge in the anaerobic tank 11. Furthermore, at the same time the organic material in the raw water is taken up by the microorganisms.

Some of the mixed liquor in the anaerobic tank 11 is sent to a solid/liquid separating means 16 and the remainder is sent to the aerobic tank 12, treated aerobically with air which is blown in from a dispersing pipe, and the organic material is subjected to an aerobic degradation treatment and the ammonia component, etc., is nitrated or nitrited.

Moreover, an oxygen-free tank (not shown in the drawing) in which bound oxygen (nitrate ion or nitrite ion) is applied can be established instead of the aerobic tank 12. In this case, the bound oxygen is a solution of nitrate or nitrite, for example a nitrated ammonia-containing liquid, which is added from outside. The oxygen-free tank in which bound oxygen is applied is no different aerobically in that bound oxygen is applied instead of oxygen gas.

Figure 6:
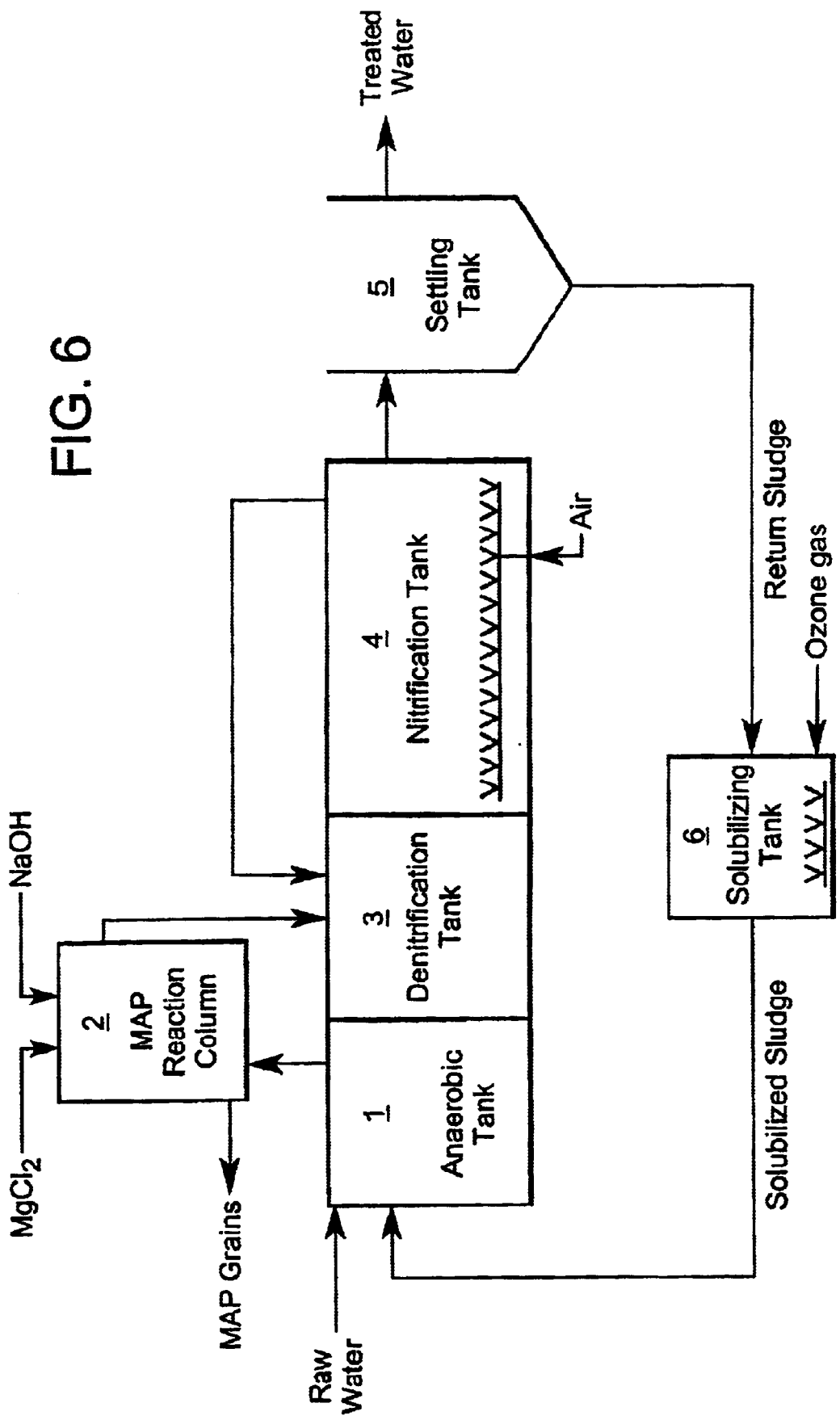
FIG. 6 is a schematic drawing of another conventional apparatus for the biological removal of phosphorus.
Figure 7:
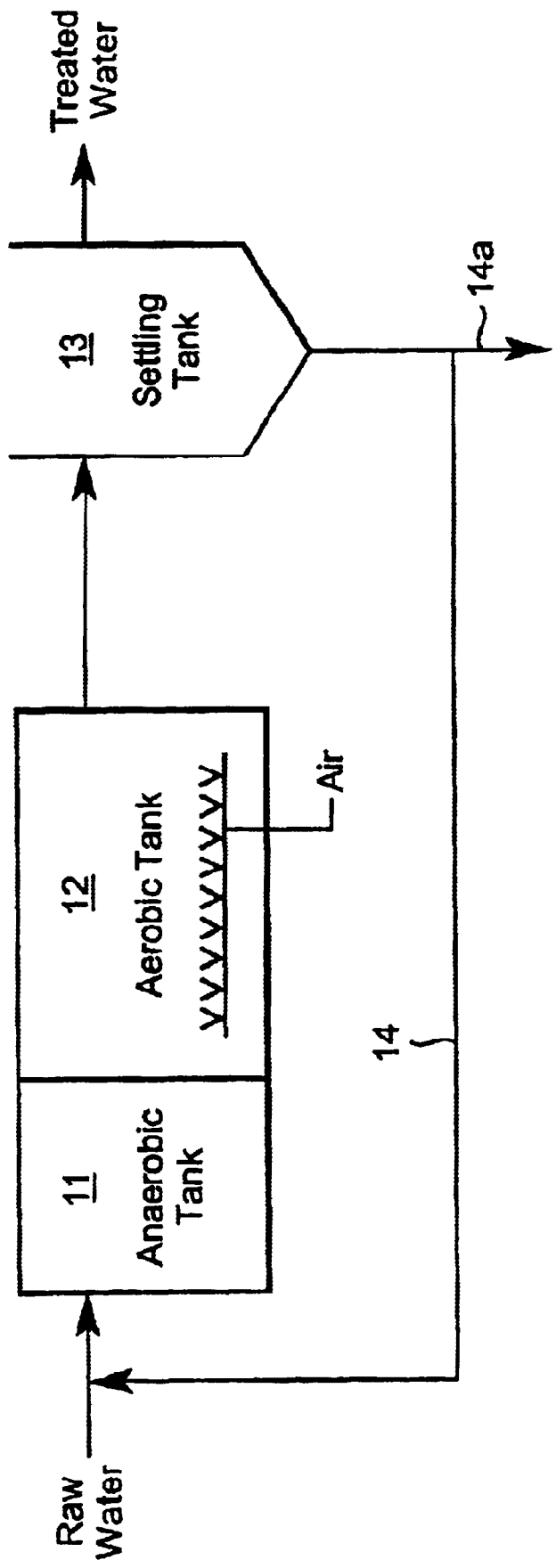
FIG. 7 is a schematic drawing of another conventional apparatus for the biological removal of phosphorus.

Furthermore, a denitrification tank may be established between the anaerobic tank and the aerobic tank, as shown in FIG. 6, and the mixed liquor in the aerobic tank may be circulated to the denitrificaion tank.

The mixed liquor flowing out of the aerobic tank 12 is introduced into the settling tank 13 (the first solid/liquid separating means) and subjected to solid/liquid separation, and the supernatant water is taken out as treated water. Some of the settled sludge is discharged from the pipe 14a as excess sludge and the remaining sludge is returned to the anaerobic tank 11 as described before via a sludge return pipe 14.

Some of the water which contains released phosphorus in the anaerobic tank 11 is sent via a pipe 15 to the second solid/liquid separating means 16 and subjected to a solid/liquid separation treatment.

The separated water fraction is sent to the phosphorus-removing apparatus 17 and the phosphorus is removed. The water which is introduced into the phosphorus-removing apparatus 17 has a high dissolved phosphorus concentration and, since the sludge has been separated, the phosphorus removal efficiency of said phosphorus-removing apparatus 17 is very high. The water from which the phosphorus has been removed in the phosphorus-removing apparatus 17 is introduced into the aerobic tank 12 from the pipe 18, or it is introduced into an aerobic tank other than the aerobic tank 12, and subjected to an aerobic treatment and then discharged as treated water.

Some of the solid fraction from the solid/liquid separating means 16 is introduced via a pipe 21 and a pipe 21a or a pipe 21b to the anaerobic tank 11 or the aerobic tank 12. The remainder is sent from the pipe 19 to a solubilizing tank 20 and subjected to a solubilizing treatment, and then it is returned via the pipe 22 to the anaerobic tank 11. The amount of excess sludge is markedly reduced by subjecting the sludge to a solubilizing treatment in this way.

Furthermore, the solubilized sludge is taken up as a carbon source at the time of phosphorus release by the microorganisms in the anaerobic tank 11.

A settling-type separating apparatus, a centrifugal separating apparatus, or a membrane separating apparatus, for example, can be used for the abovementioned second solid/liquid separating means 16.

A crystallization apparatus, such as an MAP reaction column or a coagulation separating apparatus, for example, can be used for the phosphorus-removing apparatus 17.

Furthermore, an ozone-blowing tank, for example, can be used for the solubilizing tank 20, but a tank constructed in such a way as to provide thermal or mechanical solubilization can also be used.

In the embodiment described above, some of the sludge from the second solid/liquid separating means 16 is introduced into the aerobic tank 12, but all of the sludge from the solid/liquid separating means 16 may be introduced into the solubilizing tank 20.

When all of the sludge from the second solid/liquid separating means 16 is introduced into the solubilizing tank 20, the amount of excess sludge produced is reduced further, but the reduction in sludge volume is carried out excessively and there are cases where it is impossible to maintain an appropriate sludge concentration.

Figure 4:
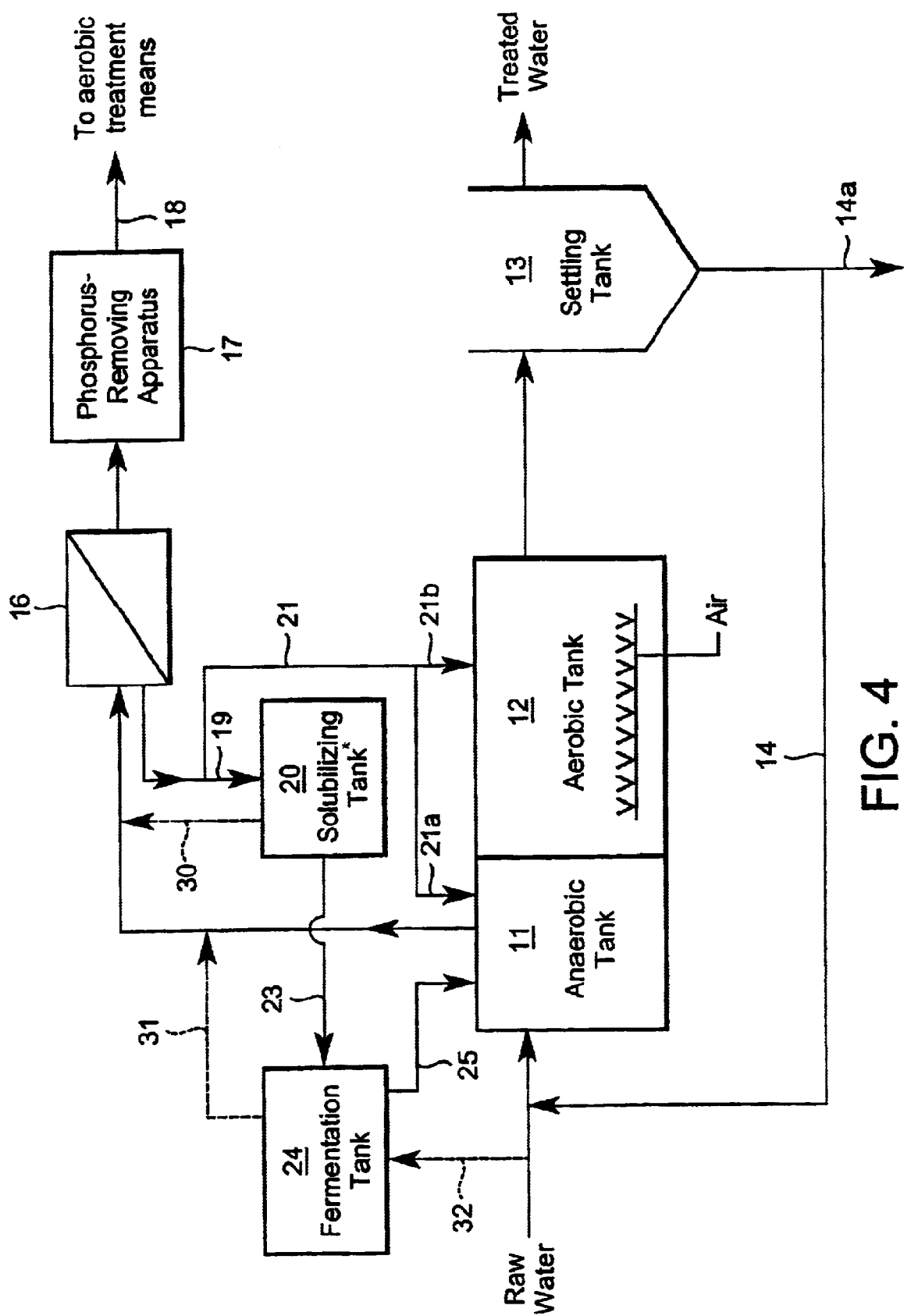
FIG. 4 is a schematic drawing of another embodiment of the invention.
Figure 5:
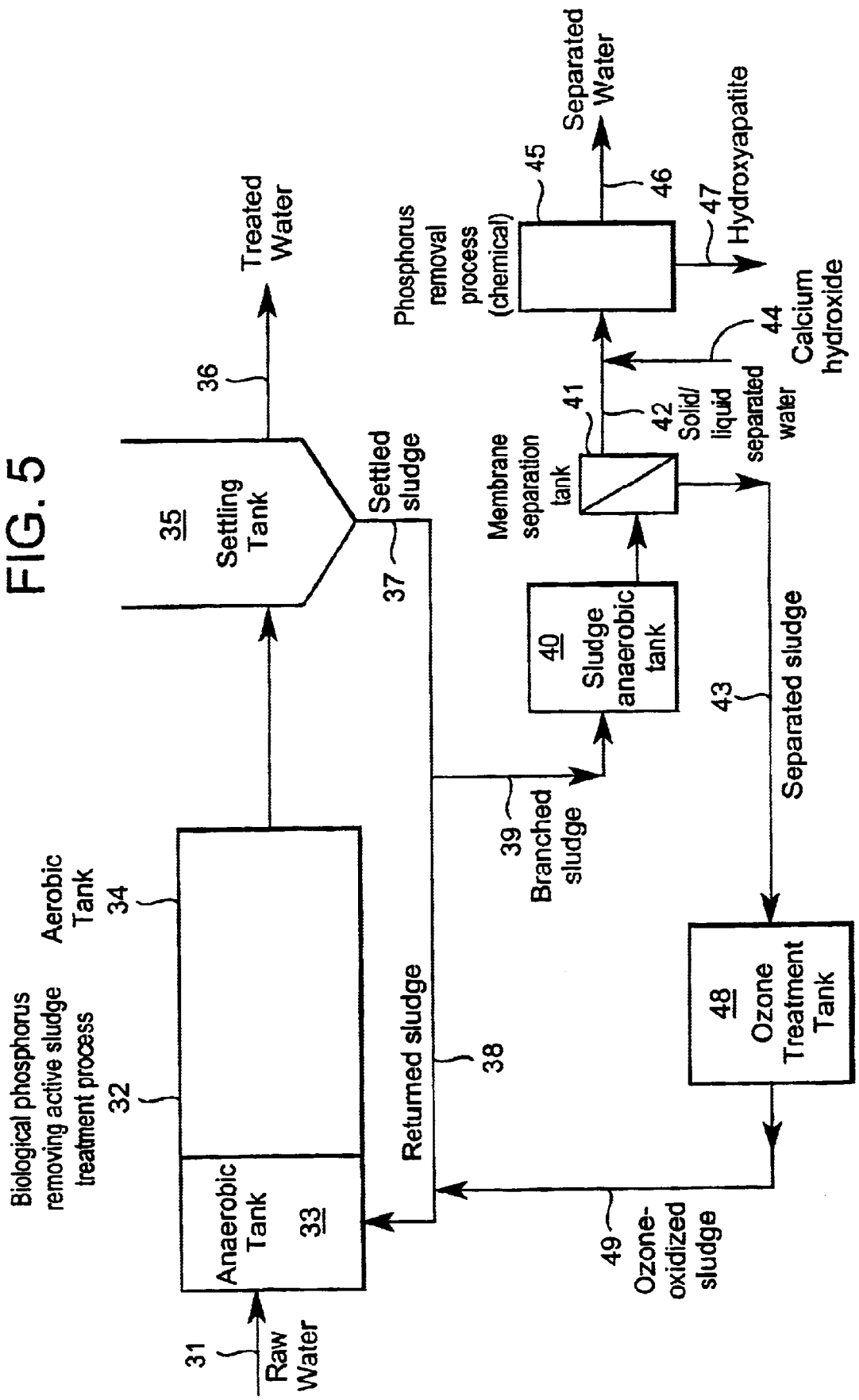
FIG. 5 is a schematic drawing of conventional apparatus for the biological removal of phosphorus.

A schematic drawing of another embodiment of apparatus for the biological removal of phosphorus of this invention is shown in FIG. 4.

In this embodiment, sludge which has been solubilized in a solubilizing tank 20 is introduced via a pipe 23 to a fermentation tank 24 and subjected to a fermentation process, and then it is sent via a pipe 25 to an anaerobic tank 11. The anaerobicity of said anaerobic tank 11 can be enforced (the dissolved oxygen concentration is greatly reduced or there is no dissolved oxygen at all) by returning the solubilized sludge to the anaerobic tank 11 after fermentation treatment in this way, and organic acids can also be supplied to the anaerobic tank 11 in large amounts, and so the phosphorus uptake/release of the sludge is increased and phosphorus can be released from the sludge in large amounts in the anaerobic tank 11.

Moreover, some of the sludge which has been solubilized in the solubilizing tank 20 may be sent via a pipe 30 to a second solid/liquid separating means 16, and sludge which has been fermented in the fermentation tank 24 may be sent via a pipe 31 to the second solid/liquid separating means 16. By this means the phosphorus concentration in the water which is flowing into the solid/liquid separating means 16 is increased and more phosphorus can be removed in the phosphorus-removing apparatus 17.

Furthermore, some of the raw water may be introduced via a pipe 32 into the fermentation tank 24. By this means, the ammonia which is produced during fermentation can be diluted and the toxicity can be reduced, and there is a further advantage in that, by dilution with raw water, the pH in the fermentation tank can be maintained at a suitable level.

Comparative Experiment 1

An apparatus for the biological removal of phosphorus with the construction shown in FIG. 1 was operated in the way indicated below without using the phosphorus-removing tank 15, the solid/liquid separating means 16, the solubilizing tank 20, and the fermentation tank 24.

Thus, a 10 liter capacity reaction column apparatus comprising an aerobic tank 11 (4 liter capacity) and an aerobic tank 12 (6 liter capacity) was used. In this experiment, a synthetic material comprising acetic acid, sodium acetate, and peptone was used for the organic substrate. Potassium phosphate was used as the phosphorus source, and other trace components ($Ca^{2+}$, $Mg^{2+}$ and $Fe^{2+}$) were added to the raw water. The acetate COD concentration and the peptone COD concentration in the raw water were each maintained at about 100 mg/L. The phosphorus/acetate COD ratio in the raw water was maintained at 0.04 (soluble phosphate concentration in the raw water 4 mg/L).

In this comparative experiment the total COD loaded on the system was adjusted to 1.0 $kgCOD/m^3 \cdot d$, and the sludge retention time (SRT) was set to about 6 days.

The hydraulic retention time (HRT) of the system was maintained at 4.8 hr by maintaining a raw water feed of 50 L/d.

After operating for about 1 month, the mixed liquor volatile suspended solid (MLVSS) in the reaction column had stabilized to some 2.4 to 2.6 gTS/L under these conditions, and the phosphorus content of the sludge was observed to be some 4.5 to 5.0% of the total sludge solid.

The phosphorus concentration in the out-flowing treated water was less than 0.5 mg/L over almost all of the operating period. The amount of excess sludge produced was 2.0 g/day.

Experiment 2

After operating for about 1 month in the comparative experiment, the operation was continued with apparatus constructed as shown in FIG. 1 but without operating the fermentation tank 24. Moreover, a membrane separating apparatus was used for the second solid/liquid separating means 16 and an ozone treatment tank was used for the sludge solubilizing tank 20. The ozonized-oxygen blowing rate was 75 l/min.

The soluble phosphorus concentration in the phosphorus-releasing tank 15 was from 50 to 75 mg/L. The amount of water flowing out from the solid/liquid separating means 16 to the phosphorus-removing apparatus 17 was some $1/12^{th}$ to $1/18^{th}$ of the amount of water flowing in from the phosphorus-releasing tank 15 to said solid/liquid separating means 16.

It was seen to be desirable to return from $1/3^{rd}$ to $2/3^{rd}$ of the sludge extracted from the settling tank 13 from the solubilizing tank 20 to the phosphorus-releasing tank 15 in order to achieve highly efficient phosphorus removal.

The amount of solubilized sludge introduced into the phosphorus-releasing tank 15 affects the HRT in said phosphorus-releasing tank. It was seen that the HRT should be at least 2 hours if a large amount of solubilized sludge was introduced.

The SRT in the solubilizing tank 20 was adjusted so as to be 6 days.

The total solid (TS) concentration in the tanks 11 and 12 increased slightly to some 3.0 to 3.2 g/L, and the value became more or less stable after operating for 2 months.

During this operation, the phosphorus concentration in the water flowing out from the settling tank 13 was for most of the time from 1.0 to 1.5 mg/L.

Experiment 3

The fermentation tank 24 in the apparatus shown in FIG. 1 was brought into operation in order to reduce this phosphorus concentration. About 50% of the sludge was subjected to fermentation treatment when the HRT in the fermentation tank 24 was set to not more than 1 day.

The phosphorus concentration in the treated water was reduced to less than 0.5 mg/L by operating the fermentation tank 24. Moreover, the construction was such that some or all of the sludge from the pipe 23 was returned to the fermentation tank 24 depending on the COD/P ratio of the raw water.

Comparative Experiment 4

Apparatus for the biological removal of phosphorus with the construction shown in FIG. 4 was operated in the way indicated below. Moreover, the apparatus shown in FIG. 4 comprised an anaerobic tank 11, an aerobic tank 12, a settling tank 13 and a sludge return pipe 14, and it was constructed by omitting the pipes 15, 22, 21*a* and 21*b* from the tanks 11 and 12 in the apparatus shown in FIG. 3.

Reaction column apparatus of 10 liter capacity comprising an aerobic tank 11 of 4 liter capacity and an aerobic tank 12 of 6 liter capacity was used. In this experiment, a synthetic material comprising acetic acid, sodium acetate and peptone was used for the organic substrate. Potassium phosphate was used as the phosphorus source, and other trace components ($Ca^{2+}$, $Mg^{2+}$ and $Fe^{2+}$) were added to the raw water. The acetate COD concentration and the peptone COD concentration in the raw water were each maintained at about 100 mg/L. The phosphorus/acetate COD ratio in the raw water was maintained at 0.04 (soluble phosphate concentration in the raw water 4 mg/L).

In this experiment, the total COD loaded on the system was adjusted to 1.0 kgCOD/m$^3$·d, and the retention time SRT was set to about 6 days.

The HRT of the system was maintained at 4.8 hr by maintaining a raw water feed of 50 L/d.

After operating for about 1 month, the MLVSS in the reaction column had stabilized to some 2.4 to 2.6 gTS/L under these conditions, and the phosphorus content of the sludge was observed to be some 4.5 to 5.0% of the total sludge solid.

The phosphorus concentration in the out-flowing treated water was less than 0.5 mg/L over almost all of the operating period. The amount of excess sludge produced was 2.0 g/day.

Experiment 5

After operating for about 1 month in experiment 1, the operation was continued with apparatus constructed with the pipes 15, 22 and 21 connected as shown in FIGS. 1–3 to the tanks 11 and 12. Moreover, membrane separating apparatus was used for the second solid/liquid separating means 16 and an ozone treatment tank was used for the sludge solubilizing tank 20. The ozonized-oxygen blowing rate was 75 ml/min.

The soluble orthophosphate phosphorus concentration in the anaerobic tank 11 was from 25 to 40 mg/L. The amount of water flowing out from the solid/liquid separating means 16 to the phosphorus-removing apparatus 17 was some $\frac{1}{8}^{th}$ to $\frac{1}{10}^{th}$ of the amount of water flowing in from the phosphorus-releasing tank 15 to said solid/liquid separating means 16. The amount of water taken out from the pipe 15 was generally adjusted in such a way that an SRT of 6 days was achieved in the anaerobic tank 11 and the aerobic tank 12. The amount of water split off to the pipe 21 was from 0 to 15% of the amount of water flowing out from the solid/liquid separating means 16.

The TS concentration in the tanks 11 and 12 increased slightly to some 3.0 to 3.2 g/L, and the value became more or less stable after operating for 2 months.

During this operation, the phosphorus concentration in the water flowing out from the settling tank 13 was for most of the time from 0.5 to 1.0 mg/L, only a little higher than in Experiment 4.

During the operating period, the amount of excess sludge produced was 0.1 g/day. The TS concentration in the tanks 11 and 12 was stable and the phosphorus concentration in the treated water was also low. Hence, it was seen that this is a stable process for the removal of phosphorus without having to deal with excess sludge.

In this experiment, the acetate COD was satisfactory for promoting the removal of phosphorus which solubilized in the raw water.

As indicated above, the present invention provides apparatus for the biological removal of phosphorus with which sludge volume can be reduced and phosphorus removal can be achieved in a stable manner.

Although the present invention has been described in connection with exemplary embodiments thereof, it will be appreciated by those skilled in the art that additions, deletions, modifications, and substitutions not specifically described may be made without departing from the spirit and scope of the invention as defined in the appended claims.

What is claimed is:

1. A biological method of removing phosphorus from raw water, comprising:

releasing phosphorus from activated sludge in a first anaerobic tank in a phosphorus-releasing step, absorbing the phosphorus with activated sludge in a mixed liquor of the raw water and the activated sludge in an aerobic tank in a phosphorus-absorbing step, separating sludge from the mixed liquor in a first solid/liquid separation step, supplying the sludge which has been concentrated and separated from the mixed liquor in the first solid/liquid separation step to a second anaerobic tank in a second phosphorus-releasing step, subjecting the sludge from the second phosphorus-releasing step to a second solid/liquid separation step, solubilizing sludge which has been concentrated and separated in the second solid/liquid separation step in a solubilizing step, supplying at least some of the sludge which has been solubilized in the solubilizing step to the first anaerobic tank, supplying at least some of the sludge which has been solubilized in the solubilizing step to the second anaerobic tank, and removing phosphorus from liquid which has been separated in the second solid/liquid separation step.

2. The method of claim 1, wherein some of the sludge separated in the second solid/liquid separation step by-passes the solubilizing step and is supplied to the first anaerobic tank.

3. The method of claim 1, wherein the solubilized sludge is fermented in a fermentation treatment process prior to being supplied to the first anaerobic tank.

4. The method of claim 2, wherein the solubilized sludge is fermented in a fermentation treatment process prior to being supplied to the first anaerobic tank.

5. An apparatus for the biological removal of phosphorus from raw water, the apparatus comprises:

a first anaerobic tank into which the raw water and activated sludge are introduced to form a mixed liquor, an aerobic tank in which the mixed liquor from the first anaerobic tank is aerated, a settling tank in which the mixed liquor flowing out of said aerobic tank is subjected to solid/liquid separation, a first pipe connecting the settling tank to the first anaerobic tank whereby some of the sludge separated from the mixed liquor in the settling tank is returned as the activated sludge to the first anaerobic tank, a second anaerobic tank in which a remaining portion of the separated sludge from the settling tank is maintained anaerobically and phosphorus is released from the sludge, a solid/liquid separating device in which sludge admixed liquid from the second anaerobic tank is subjected to solid/liquid separation, a solubilizing device in which sludge separated in said solid/liquid separating device is solubilized, a solubilized sludge returning device with which sludge which has been solubilized in said solubilizing device is returned to the first anaerobic tank, a second pipe for supplying some of the sludge which has been solubilized in the solubilizing device to the second anaerobic tank, and a phosphorus-removing device in which phosphorus is removed from water which has been separated in the solid/liquid separating device.

6. The apparatus of claim 5, further comprising a fermentation tank, into which the sludge which has been solubilized in the solubilizing device is introduced and subjected to a fermentation treatment, and the sludge which has been subjected to the fermentation treatment in said fermentation tank is returned to the first anaerobic tank.

7. The apparatus of claim 6, further comprising means for supplying some of the sludge which has been subjected to the fermentation treatment in the fermentation tank to the second anaerobic tank.

8. The apparatus of claim 7, further comprising means for supplying at least some of the sludge separated in said solid/liquid separating device directly to the first anaerobic tank.

9. An apparatus for the biological removal of phosphorus from raw water, the apparatus comprises:
   a first anaerobic tank into which the raw water and activated sludge are introduced to form a mixed liquor,
   an aerobic tank in which the mixed liquor from the first anaerobic tank is aerated,
   first solid/liquid separating means for solid/liquid separation of the mixed liquor flowing out of said aerobic tank,
   means for returning some of the sludge separated from the mixed liquor in the first solid/liquid separating means is returned as the activated sludge to the first anaerobic tank,
   a second anaerobic tank in which a remaining portion of the separated sludge from the settling tank is maintained anaerobically and phosphorus is released from the sludge,
   second solid/liquid separating means for solid/liquid separation of the sludge admixed liquid from the second anaerobic tank,
   means for solubilizing sludge separated in said second solid/liquid separating means,
   solubilized sludge returning means for returning at least some of the sludge which has been solubilized in said solubilizing means to the first anaerobic tank,
   means for supplying at least some of the sludge which has been solubilized in the solubilizing means to the second anaerobic tank, and
   means for removing phosphorus from liquid which has been separated in the second solid/liquid separating means.

10. The apparatus of claim 9, further comprising:
    a fermentation tank, into which the sludge which has been solubilized in the solubilizing means is introduced and subjected to a fermentation treatment, and
    means for returning the sludge which has been subjected to the fermentation treatment in said fermentation tank to the first anaerobic tank.

11. The apparatus of claim 10, further comprising means for supplying some of the sludge which has been subjected to the fermentation treatment in the fermentation tank to the second anaerobic tank.

12. The apparatus of claim 11, further comprising means for supplying at least some of the sludge separated in said second solid/liquid separating means directly to the first anaerobic tank.

13. An apparatus for the biological removal of phosphorus from raw water, the apparatus comprises:
    a first anaerobic tank into which the raw water and activated sludge are introduced to form a mixed liquor,
    an anoxic tank in which bound oxygen is applied to the mixed liquor from said first anaerobic tank,
    an aerobic tank in which the mixed liquor from said oxygen-free tank is aerated.
    a first pipe which returns some of the mixed liquor from said aerobic tank to the oxygen-free tank,
    a settling tank in which the mixed liquor flowing out of said aerobic tank is subjected to solid/liquid separation,
    a second pipe whereby some of the solid/liquid separated sludge from the settling tank is returned as the activated sludge to the first anaerobic tank,
    a second anaerobic tank in which a remaining portion of the separated sludge from the settling tank is maintained anaerobically and the phosphorus is released,
    a solid/liquid separating device in which the sludge admixed liquid from said second anaerobic tank is subjected to solid/liquid separation,
    a solubilizing device in which the sludge separated in said solid/liquid separating device is solubilized,
    a solubilized sludge returning device in which sludge which has been solubilized in said solubilizing device is returned to the first anaerobic tank,
    a third pipe for supplying some of the sludge which has been solubilized in the solubilizing device to said second anaerobic tank, and
    a phosphorus-removing device in which phosphorus is removed from water which has been separated in the solid/liquid separating device.

14. The apparatus of claim 13, further comprising a fermentation tank, into which the sludge which has been solubilized in the solubilizing device is introduced and subjected to a fermentation treatment, and the sludge which has been subjected to the fermentation treatment in said fermentation tank is returned to the first anaerobic tank.

15. The apparatus of claim 14, further comprising means for supplying some of the sludge which has been subjected to the fermentation treatment in the fermentation tank to the second anaerobic tank.

16. The apparatus of claim 15, further comprising means for supplying at least some of the sludge separated in said solid/liquid separating device directly to the first anaerobic tank.

17. An apparatus for the biological removal of phosphorus from raw water, the apparatus comprising:
    a first anaerobic tank into which the raw water and activated sludge are introduced to form a mixed liquor,
    an anoxic tank in which bound oxygen is applied to the mixed liquor from said first anaerobic tank,
    an aerobic tank in which the mixed liquor from said oxygen-free tank is aerated,
    mixed liquor returning means which returns some of the mixed liquor from said aerobic tank to the oxygen-free tank,
    first solid/liquid separating means in which the mixed liquor flowing out of said aerobic tank is subjected to solid/liquid separation,
    means whereby some of the solid/liquid separated sludge from said first solid/liquid separating means is returned as the activated sludge to the first anaerobic tank,
    a second anaerobic tank in which the remaining solid/liquid separated sludge from the first solid/liquid separating means is maintained anaerobically and the phosphorus is released,
    second solid/liquid separating means in which the sludge admixed liquid from said second anaerobic tank is subjected to solid/liquid separation, solubilizing means in which the sludge separated in said second solid/liquid separating means is solubilized, solubilized sludge returning means with which at least some of the sludge which has been solubilized in said solubilizing means is returned to the first anaerobic tank, means for supplying at least some of the sludge which has been solubilized in the solubilizing means to said second anaerobic tank, and phosphorus-removing means for removing phosphorus from water which has been separated in the second solid/liquid separating means.

18. The apparatus of claim 17, further comprising a fermentation tank, into which the sludge which has been solubilized in the solubilizing means is introduced and subjected to a fermentation treatment, and the sludge which has been subjected to the fermentation treatment in said fermentation tank is returned to the first anaerobic tank.

19. The apparatus of claim 18, further comprising means for supplying some of the sludge which has been subjected to the fermentation treatment in the fermentation tank to the second anaerobic tank.

20. The apparatus of claim 19, further comprising means for supplying at least some of the sludge separated in said second solid/liquid separating means directly to the first anaerobic tank.

21. An apparatus for the biological removal of phosphorus from raw water, the apparatus comprises:

an anaerobic tank into which the raw water and activated sludge are introduced to form a mixed liquor, an aerobic tank in which the mixed liquor from said anaerobic tank is aerated, first solid/liquid separating means in which the mixed liquor flowing out of said aerobic tank is subjected to solid/liquid separation, means for returning at least some of the solid/liquid separated sludge from said first solid/liquid separating means as the activated sludge to the anaerobic tank, second solid/liquid separating means in which some of the mixed liquor discharged from the anaerobic tank is subjected to solid/liquid separation, solubilizing means for solubilizing at least some of the sludge separated in said second solid/liquid separating means, solubilized sludge returning means with which sludge which has been solubilized in said solubilizing means is returned to the anaerobic tank, and phosphorus-removing means with which phosphorus is removed from water which has been separated in the second solid/liquid separating means.

22. The apparatus of claim 21, further comprising means whereby the water, from which the phosphorus has been removed in the phosphorus-removing means, is subjected to an aerobic treatment or whereby said water is supplied to the oxygen-free tank or the aerobic tank.

23. The apparatus of claim 21, wherein the solubilized sludge returning means supplies some of the sludge which has been separated by the second solid/liquid separating means to the solubilizing means, and further comprising means which supplies a remainder of the sludge which has been separated by said second solid/liquid separating means to the anaerobic tank or the aerobic tank.

24. An apparatus for the biological removal of phosphorus from raw water, the apparatus comprises:

an anaerobic tank into which the raw water and activated sludge are introduced to form a mixed liquor, an oxygen-free tank in which bound oxygen is applied to the mixed liquor from said anaerobic tank, an aerobic tank in which the mixed liquor from said oxygen-free tank is aerated, first solid/liquid separating means in which the mixed liquor flowing out of said aerobic tank is subjected to solid/liquid separation, means for returning at least some of the solid/liquid separated sludge from said first solid/liquid separating means as the activated sludge to the anaerobic tank, second solid/liquid separating means in which some of the mixed liquor discharged from the anaerobic tank is subjected to solid/liquid separation, solubilizing means in which at least some of the sludge separated in said second solid/liquid separating means is solubilized, solubilized sludge returning means with which at least some of the sludge which has been solubilized in said solubilizing means is returned to the anaerobic tank, and phosphorus-removing means with which phosphorus is removed from water which has been separated in the second solid/liquid separating means.

25. The apparatus of claim 24, further comprising means whereby the water, from which the phosphorus has been removed in the phosphorus-removing means, is subjected to an aerobic treatment or whereby said water is supplied to the oxygen-free tank or the aerobic tank.

26. The apparatus of claim 24, wherein the solubilized sludge returning means supplies some of the sludge which has been separated by the second solid/liquid separating means to the solubilizing means, and further comprising means which supplies a remainder of the sludge which has been separated by said second solid/liquid separating means to the anaerobic tank or the aerobic tank.

27. The apparatus of claim 24, further comprising a fermentation tank, into which at least some of the sludge which has been solubilized in the solubilizing means is introduced and subjected to a fermentation treatment, and the sludge which has been subjected to the fermentation treatment in said fermentation tank is returned to the anaerobic tank.

28. The apparatus of claim 27, wherein the solubilized sludge returning means supplies only some of the sludge which has been solubilized in the solubilizing means to the fermentation tank, and there is provided a means by which a remainder of the sludge which has been solubilized in said solubilizing means is supplied to the second solid/liquid separating means.

29. The apparatus of claim 28, further comprising means for supplying some of the sludge which has been subjected to a fermentation treatment in the fermentation tank to the second solid/liquid separating means.

30. The apparatus of claim 29, further comprising means whereby some of the raw water is supplied to the fermentation tank.

31. An apparatus for the biological removal of phosphorus from raw water, the apparatus comprises:

an anaerobic tank into which the raw water and activated sludge are introduced to form a mixed liquor, an aerobic tank in which the mixed liquor from said anaerobic tank is aerated, first solid/liquid separating means in which the mixed liquor flowing out of said aerobic tank is subjected to solid/liquid separation, means for returning at least some of the sludge separated from the mixed liquor in said first solid/liquid separating means as the activated sludge to the anaerobic tank, second solid/liquid separating means in which some of the mixed liquor discharged from the anaerobic tank is subjected to solid/liquid separation, solubilizing means for solubilizing at least some of the sludge separated in said second solid/liquid separating means, solubilized sludge returning means with which sludge which has been solubilized in said solubilizing means is returned to the anaerobic tank, means for returning at least some of the sludge separated in said second solid/liquid separating means to at least one of the anaerobic tank and the aerobic tank, and phosphorus-removing means with which phosphorus is removed from water which has been separated in the second solid/liquid separating means.

32. The apparatus of claim 31, wherein at least some of the sludge separated in said second solid/liquid separating means is returned to both the anaerobic tank and the aerobic rank.

33. An apparatus for the biological removal of phosphorus from raw water, the apparatus comprises:

an anaerobic tank into which the raw water and activated sludge are introduced to form a mixed liquor, an aerobic tank in which the mixed liquor from said anaerobic tank is aerated, first solid/liquid separating means in which the mixed liquor flowing out of said aerobic tank is subjected to solid/liquid separation, means for returning at least some of the solid/liquid separated sludge from said first solid/liquid separating means as the activated sludge to the anaerobic tank, second solid/liquid separating means in which some of the mixed liquor discharged from the anaerobic tank is subjected to solid/liquid separation, means for returning at least some of the solid/liquid separated sludge from said second solid/liquid separating means to at least one of the anaerobic tank and the aerobic tank, solubilizing means for solubilizing at least some of the sludge separated in the second solid/liquid separating means, a fermentation tank, into which at least some of the sludge which has been solubilized is introduced and subjected to a fermentation treatment, means for supplying solubilized sludge to the fermentation tank, means for returning at least some of the sludge subjected to the fermentation treatment to the anaerobic tank, and phosphorus-removing means with which phosphorus is removed from water which has been separated in the second solid/liquid separating means.

34. The apparatus of claim 33, wherein at least some of the sludge separated in said second solid/liquid separating means is returned to both the anaerobic tank and the aerobic tank.

35. The apparatus of claim 33, further comprising means for returning at least some of the solubilized sludge to the second solid/liquid separating means.

36. The apparatus of claim 33, further comprising a means for supplying at least some of the sludge subjected to the fermentation treatment to the second solid/liquid separating means.

37. The apparatus of claim 33, further comprising means for supplying raw water to the fermentation tank.

* * * * *